(12) United States Patent
Arrichiello

(10) Patent No.: US 6,484,601 B1
(45) Date of Patent: Nov. 26, 2002

(54) BELLOWS ACTUATION DEVICE, SPECIALLY FOR ROBOTIC MANIPULATOR, AND METHOD TO OPERATE SAID DEVICE

(76) Inventor: Vincenzo Arrichiello, Via S. Antonio 7, La Spezia (IT), I-19121

( * ) Notice: Subject to any disclaimer, the term of this patent is extended or adjusted under 35 U.S.C. 154(b) by 0 days.

(21) Appl. No.: 09/762,172

(22) PCT Filed: Aug. 4, 1999

(86) PCT No.: PCT/IB99/01544
§ 371 (c)(1),
(2), (4) Date: Feb. 2, 2001

(87) PCT Pub. No.: WO00/07781
PCT Pub. Date: Feb. 17, 2000

(30) Foreign Application Priority Data

Aug. 5, 1998 (IT) .......................................... JP98A0006

(51) Int. Cl.$^7$ .............................. B25J 15/00; B25J 9/14; F01B 19/00; F16J 3/04

(52) U.S. Cl. ........................... 74/490.04; 92/34; 92/37; 92/44; 294/106; 294/119.3; 414/740

(58) Field of Search ............................... 74/108, 490.04, 74/17.8; 92/34, 37, 39, 44; 901/22, 37; 414/739, 740; 294/106, 119.3

(56) References Cited

U.S. PATENT DOCUMENTS

| 1,744,241 | A | * | 1/1930 | Pierle ............................ 92/44 |
| 1,764,193 | A | * | 6/1930 | Bruehl ....................... 236/48 R |
| 1,928,368 | A | * | 9/1933 | Coffey ............................ 92/44 |
| 3,654,855 | A | * | 4/1972 | Longo ..................... 100/229 A |
| 3,981,528 | A | | 9/1976 | Andorf et al. |
| 4,350,381 | A | * | 9/1982 | Hellmann .................... 269/266 |
| 4,607,998 | A | | 8/1986 | Hawkes |
| 4,921,293 | A | | 5/1990 | Ruoff et al. |
| 4,976,191 | A | | 12/1990 | Suzumori et al. |

FOREIGN PATENT DOCUMENTS

| EP | 0 446 609 A2 | 9/1991 |
| EP | 0 534 778 A2 | 3/1993 |

OTHER PUBLICATIONS

Patent Abstracts of Japan vol. 018, No. 538 (M–1686), Oct. 13, 1994 & JP 06 190771 A (Toyota Motor Corp.), Jul. 12, 1994.
Patent Abstracts of Japan vol. 1997, No. 04, Apr. 30, 1997 & JP 08 323675 A (Kubota Corp.), Dec. 10, 1996.

* cited by examiner

Primary Examiner—William C Joyce
(74) Attorney, Agent, or Firm—Ware, Fressola, Van der Sluys & Adolphson LLP

(57) ABSTRACT

An actuation device uses, for the active element, a flexible bellows operated by a pressurized fluid (usually, but not necessarily, at a pressure higher than the ambient one). The bellows is housed, for the most part of its length, inside a cylindrical cavity having the inner diameter slightly larger than the outer diameter of the bellows, so that the bellows is free to vary its length, but is restrained to bend sideways and therefore can be operated by high pressure.

21 Claims, 3 Drawing Sheets

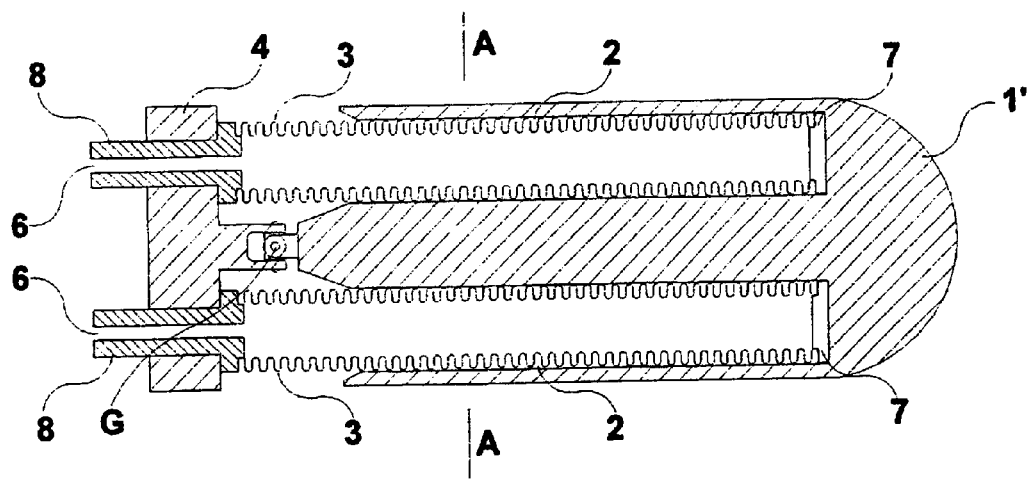
Fig. 4
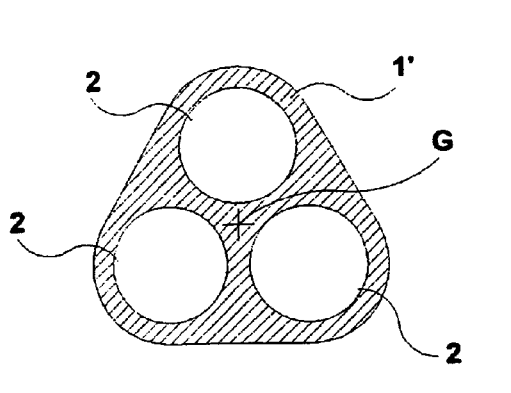 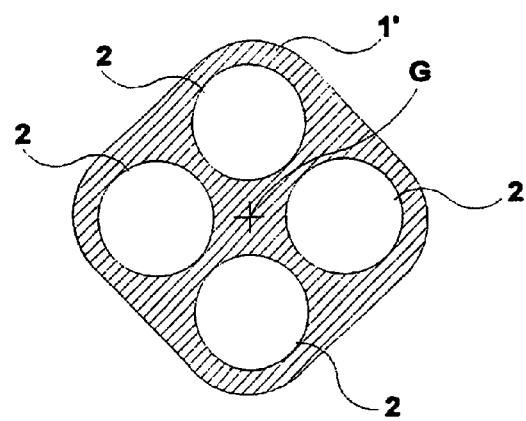
Fig. 4a  Fig. 4b
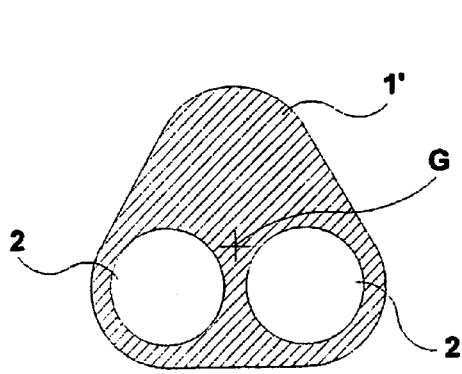 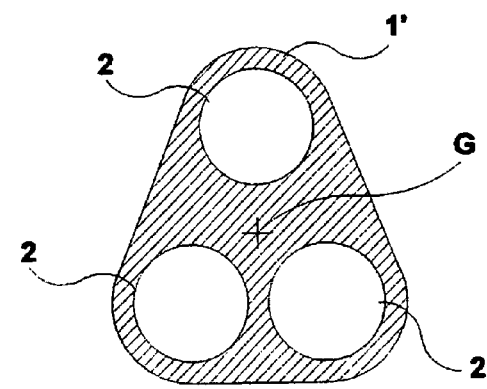
Fig. 4c  Fig. 4d

BELLOWS ACTUATION DEVICE, SPECIALLY FOR ROBOTIC MANIPULATOR, AND METHOD TO OPERATE SAID DEVICE

BACKGROUND OF THE INVENTION

1. Technical Field

The invention relates to a bellows actuation device, especially for robotic manipulator.

2. Description of the Background Art

Industrial robotic manipulators known in the art are mainly devised to handle objects having a hard structure and usually a good resistance, therefore they are usually well suited for industrial applications where a sure hold of hard and solid objects is required (e.g., metal pipes largely used in off-shore structures).

New requests are rising for robotic devices to be used, for example for scientific research activities (e.g., for biology, archaeology, geology, etc.), for example in the underwater field. This type of use requires the ability to handle and grasp fragile, delicate, and, often, soft objects, that are likely to be damaged if handled with conventional devices.

In order to prevent the possible damaging of the fragile objects, it could be possible to provide the manipulator with tactile sensors able to measure the force actually applied to the surface of the object, but this solution provides to be highly complex; and conspicuous technical problems must be addressed for its implementation in devices for special uses, as, for example the underwater one.

For example, a robotic manipulator of the articulated jaw type is known in the art and described in U.S. Pat. No. 4,607,998. The electrohydraulic actuation system subject of the patent is a two piston-cylinder assembly, fixed volume, hydraulic system operated by an electric motor by means of a screw device. Friction resulting from the piston seals and from the thrust bearings of the screw is necessary for the system operation, and is so tailored as to have an entity that restrains jaw motion due to applied external forces. This characteristic, while proving advantageous when the handled objects show a solid and hard structure, proves disadvantageous when the objects to be handled are fragile and soft ones, like biologic specimens, archaeological items, etc.

SUMMARY OF THE INVENTION

The object of the invention is to overcome the above drawbacks and to provide an actuation device using, for the active element, a flexible bellows operated by a pressurized fluid. The device of the invention solves also another problem in the case long and compliant bellows are used with pressures of the operating fluid of some relevance, according to the preferred embodiments of the invention. Bellows with these characteristics (i.e. usually having a high length-to-diameter ratio) have, starting from very low operating pressure, a structural instability phenomenon, named "buckling", causing an out-of-control sideways deformation and substantially reducing the useful output force as well as the range of motion, making this kind of bellows actually not suited to be used in manipulation devices.

The device of the invention comprises, in the basic embodiment, a bellows housed, for the most part of its length, inside a cavity, usually cylindrical in shape, having the inner diameter slightly larger than the outer diameter of the bellows so that the bellows is free to vary its length, but is restrained to bend sideways and therefore can be operated by a pressure fairly higher than the one that would cause the above mentioned instability phenomena in an unrestrained bellows. A specially suitable field of application of this type of actuator is the one of robotic grippers, where it provides more advantageous than solutions based on the use of other devices, like pneumatic or hydraulic piston-cylinder assemblies.

The bellows actuation device of the invention is virtually friction-free, thus allowing to obtain a relation between the operating pressure and the contact force applied to the handled object, that can be represented by a mathematical function without any discontinuity point. These characteristics make it possible to provide an accurate control of the contact force, thus allowing robotic manipulators able to handle fragile or delicate objects without damage.

The main advantage of the bellows actuator versus the piston-cylinder assembly is the absence of sliding seals and hence the absence of friction and wear.

This characteristic proves very useful for devices intended for handling fragile or delicate objects, by allowing an indirect measurement of the contact force applied to the object by means of a measurement of the operating pressure.

The manipulators that can be realized using the actuation device of the invention, characterized by being friction-free, overcome the above-said drawbacks and, when used in association to a suitable servo-control, can achieve a fine regulation of the contact force applied to the object, and hence a sure hold with no risk of damaging the object, without requiring complex tactile sensors.

Moreover, the manipulators subject of the invention have the characteristic of being very easy to implement and are suitable of being made of materials able to withstand fairly well the typical operating conditions of underwater robotics.

The main characteristics that are achieved are the followings.

No-friction: as well known, the friction-force vs. motion-speed relation is not only not-linear, but also not-continuous due to the transition between static and dynamic friction (when speed crosses the zero value). The presence of friction in a device that has to transfer force and motion between the actuating section and the actuated one of a manipulator, precludes the continuity of the relation linking the force applied to the object by the manipulator with the force produced by the driving device, and therefore does not allow to calculate the contact force applied to the object on the basis of the measurement of the force produced by the driving device.

Force Control: the feasibility to easily implement (without the use of special sensors) a force control (instead of a position control), makes it possible for the manipulator to have a degree of "compliance", that is the ability to adapt itself to the shape and to small displacements of the manipulated object with no substantial variation of the contact force.

A further advantage of the use of a bellows, is the feasibility to couple directly its ends to members of the manipulation device, each moving with respect to the others, with no need to use joints or couplings, because the bellows flexibility is usually adequate to allow the required degree of flexure.

Further objects and advantages of the invention will be clearly shown in the following detailed description of an example of embodiment and from the attached drawings, given for a non limiting explanatory purpose.

BRIEF DESCRIPTION OF THE DRAWINGS

FIG. 4 shows a longitudinal section of a fourth example of embodiment of the actuation device having a finger able to move in two directions thanks to a joint;

Figure 5:
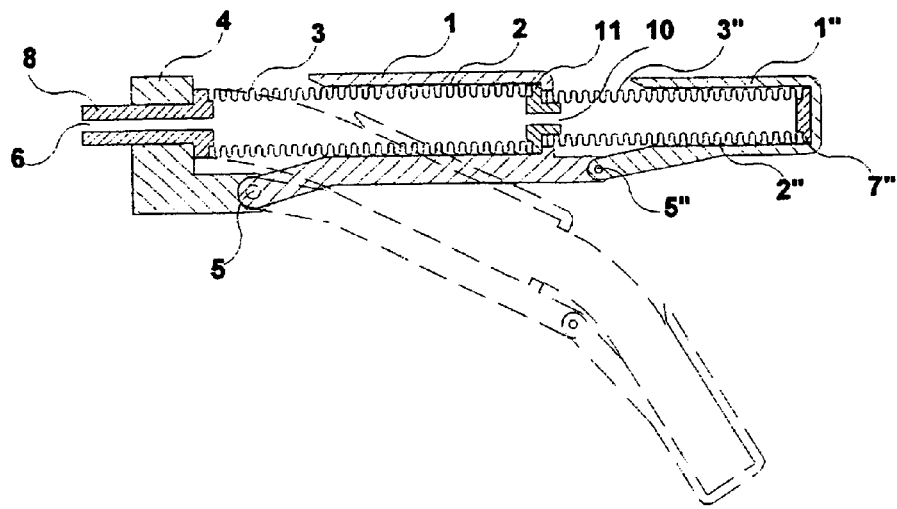
Figure 6:
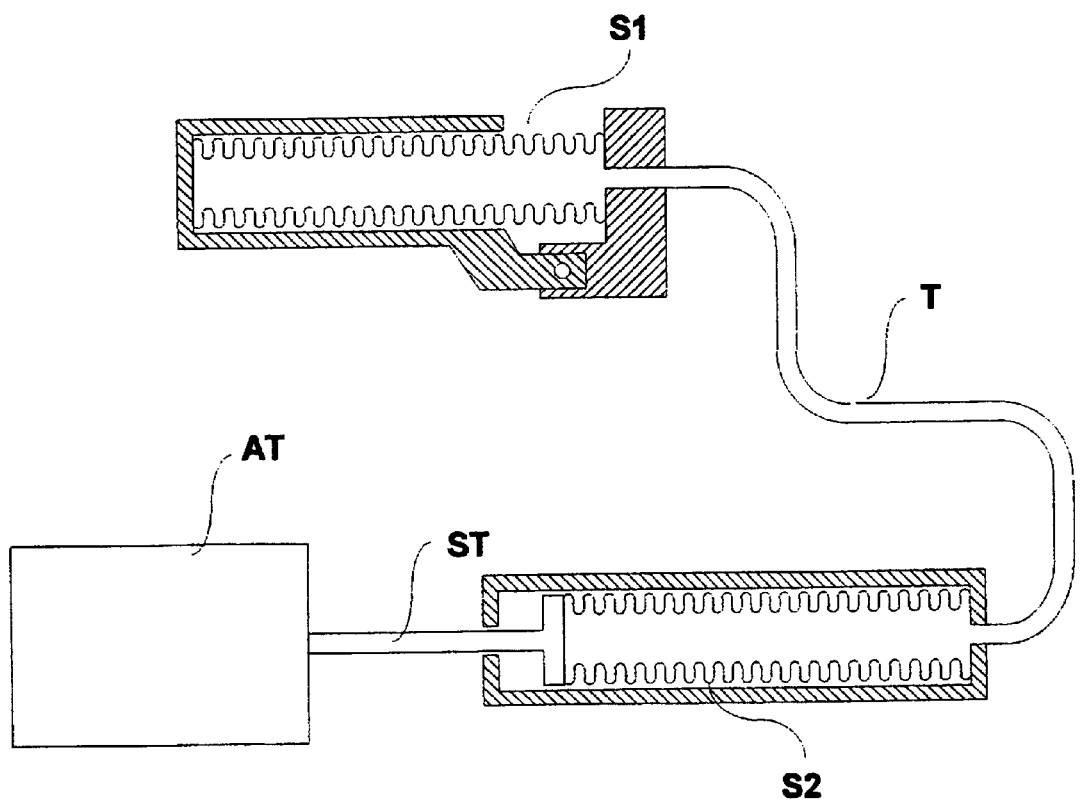

FIGS. from 4a to 4d show transverse sections of different variant embodiments of the moving member shown in FIG. 4;

FIG. 5 shows a further variant embodiment of the finger having the moving member formed by two phalanges;

FIG. 6 shows a possible example of embodiment of a system to operate the device consisting of a fixed-volume hydraulic system.

DETAILED DESCRIPTION OF THE INVENTION

Flexible bellows are tubular elements, usually but not necessarily with cylindrical symmetry, having an undulated wall, formed of a series of convolutions; this special shape gives flexible bellows high characteristics of lateral flexibility and longitudinal compliance, and at the same time good characteristics of pressure holding resistance.

This makes bellows suitable to be used as actuators having characteristics similar to the ones of hydraulic or pneumatic piston-cylinder assemblies. In fact they are able to convert the pressure of the inside fluid into mechanical force, following the longitudinal axis, and volume variations of the inside fluid into a displacement of the two ends each with respect to the other.

If the ends of the bellows are connected to two members of a device, each being able to move with respect to the other, it is possible, by pressurizing the inside fluid, not only to obtain the motion of these members each with respect to the other, but also to apply a force to these members and therefore also to other objects in contact with them.

The flexible bellows, integrated is a suitable mechanical device, is able to implement two main functions of a manipulation device; the grasping motion and the grip holding by means of the contact force.

The main differences between the bellows, used as actuators, and piston-cylinder assemblies are: absence of the friction due to the seals, ability to change in shape by means of lateral flexure, spring-like resistance to variation of length.

The resistance to variation of length is related to the longitudinal spring-rate and, as a consequence, the inside fluid must be pressurized to have a variation of the length of the bellows with reference to the length at rest.

In the use as actuators, best performances are attainable with bellows having a high length to diameter ratio, and hence a low longitudinal spring-rate and a wide length variation range, in that these make possible a wide motion range with low operating pressures.

Figure 1:
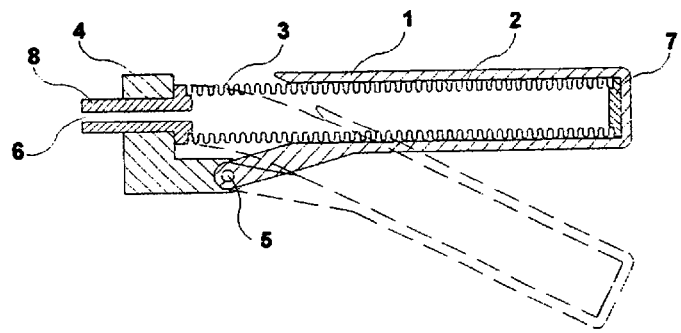
FIG. 1 shows a longitudinal section of a first embodiment example of the bellows actuation device subject of the invention.

FIG. 1 shows a longitudinal section of a particular embodiment suitable to implement a part of a manipulator able of rotational motion around an axis.

A moveable member 1, comprising a cylindrical cavity 2 housing a bellows 3, is hinged to the static member of part 4 by means of a pivot pin 5. The two ends of the bellows 3 are mounted one to the bottom of the cavity 2 of the moveable member 1 and the other to the static member 4 in face of the cavity 2. Length variations of the bellows 3 generated by the pressure of a fluid fed through the input 6, cause the rotational motion of the moveable member 1 perpendicular to the rotation axis around pivot pin 5, as shown in the phantom section that schematically represents the motion of the moveable member 1.

The two ends of the bellows 3 are mounted, by way of example, by elements 7 and 8 that seal the ends to the cavity 2 and the static part 4, with exception of the fluid input 6, formed, by way of example, by a bore in the mounting element 8.

The mounting elements 7, 8 may be of any suitable known type, by way of example screwed to the movable member 1 and static part 4.

When the moveable member 1 is in contact with an external object, by raising the pressure of the fluid inside the bellows 3, it is possible to apply a force to that object.

Figure 2:
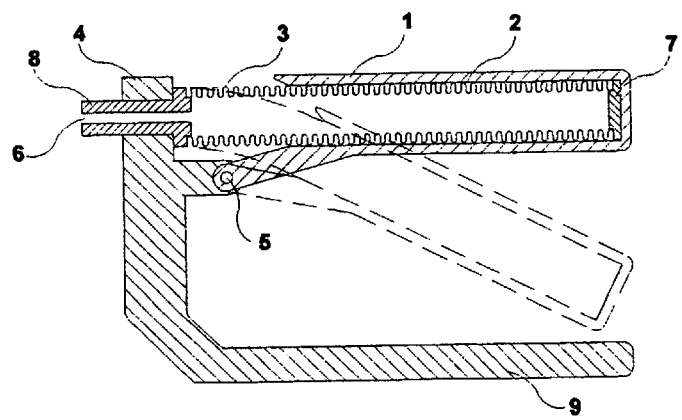
FIG. 2 shows a longitudinal section of a second example of embodiment of the actuation device having an extension of the static member.

As shown in FIG. 2, where the same reference numerals refer to the same elements of FIG. 1, if this object is placed between the movable member 1 and an element 9 solidly mounted to the static member 4 to form an extension thereof facing the moving part 1; by means of the control of the fluid pressure it is possible to grasp the object, gripping it between the moveable member 1 and the element 9 fixed to the static part 4, and to apply a desired contact force, as shown in the phantom section of the drawing that schematically represents the movement of the moveable member 1. The device can be advantageously used to implement each finger of a multi-fingered manipulator and is especially easy to make.

Figure 3:
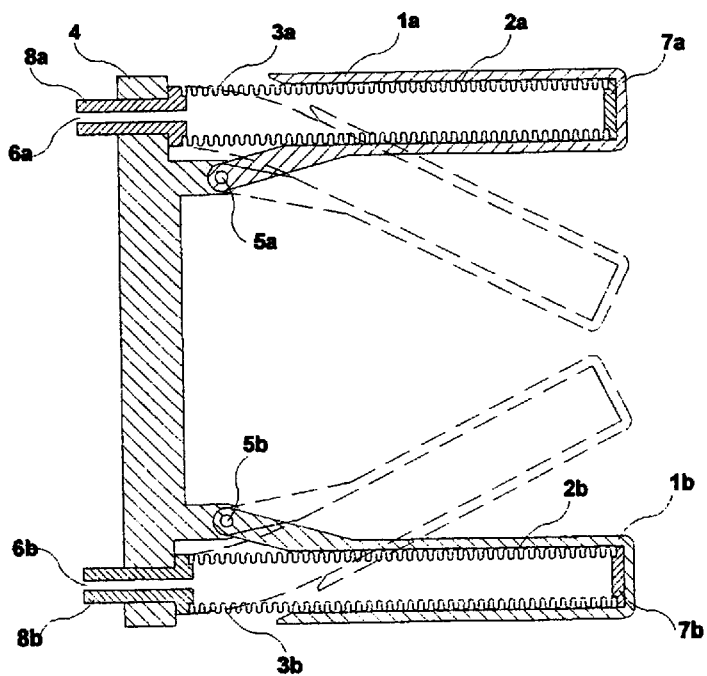
FIG. 3 shows a longitudinal section of a third example of embodiment of the actuation device having two fingers.

A two fingers manipulator, that can be implemented using two devices of the type shown in FIG. 1, having the moveable elements 1a and 1b faced each other, and a common static element 4, is shown, by way of example, in FIG. 3, where the same elements of FIG. 1 are referred to with the same reference numerals, with the addition of the subscript "a" for the first finger and "b" for the second finger.

A manipulator able to handle fragile objects may be formed of a plurality of fingers, typically three to six, mounted around a central axis, to be able to converge in order to carry out the grasping action: to obtain the desired motion of each finger, it is enough to position suitably the pivoting axes about the pivot pins 5.

As shown in FIG. 4, where the same elements of FIG. 1 are referred to with the same reference numerals, the device of the invention easily provides a finger able to move in two directions. In this kind of implementation, moveable member 1' is mounted on the static member 4 by means of a joint G allowing a two degrees-of-freedom motion about its pivot point, and is equipped by a plurality of bellows 3, typically two to four, each operated independently to each other. Therefore the finger is able to move, not only in the radial plane, but also sidewise in order to optimally position the contact point on the handled object.

In this case, the moveable member 1' is made so as to allow the housing of the plurality of bellows, by way of example making a cavity 2 for each bellows 3.

Said bellows 3, and relevant housing cavities 2, are placed, with reference to the finger centerline passing through the joint G, in a way that the resulting force of their individual actions (taking also in account the reaction of the joint) can be oriented along any direction in the plane normal to the finger centerline, depending of the different combination of amplitudes of said individual actions.

FIGS. 4a to 4d show orthogonal sections of the moveable member 1' of FIG. 4, for some implementation examples of joint-mounted fingers.

Typical symmetrical configurations may use either three bellows (with relevant housing cavities 2) equally spaced (at 120°) with reference to the finger centerline passing through the joint G, or four bellows equally spaced (at 90°), as respectively shown, in a section of the finger normal to the centerline, in FIGS. 4a and 4b.

In case it is preferable to give priority to the ability to work in a given angular sector, where the reciprocal converging motion of the fingers, required to grasp objects, proves more important, the bellows may be placed not symmetrically; by way of example, in the case of three bellows, two of these may be spaced of 90° each other and of 135° with reference to the third, as shown in FIG. 4d.

As an alternative, just two bellows can be used, spaced each other of an angle smaller than 180°, as shown in FIG. 4c.

A further configuration of a finger for robotic manipulator that can be implemented using the device subject of the invention is the one with more than one phalanges, formed of a plurality of devices mounted in series; by way of example and without restriction, a two phalanges configuration is shown in FIG. 5, where the same elements of the first of the phalanges are referred by the same reference numerals of FIG. 1, and the second phalanges is formed of a moveable member 1", with cylindrical cavity 2", pivotally mounted to the moveable member 1 of the first phalanges around pivot pin 5", and a bellows 3" joined to the bellows of the first phalanges by means of a mounting and coupling member 11 having a channel 10 through which the fluid can flow from one member to the other, and terminated at the other end by a mounting element 7".

In this configuration, the grasping ability of the manipulator is improved because each finger can close around the object, as shown in the phantom section of the drawing, sketching the movement of the moveable member 11".

Moreover, by means of a suitable tailoring of the section areas of the two bellows 3, 3" the distribution of the contact-force along the finger length can be optimized.

As for concerning the methods of operation that can be used, a pneumatic method may be used: the bellows is fed through the input 6 with pressurized air, the pressure of the air being regulated by means of a valve (or similar device); this method is well suited for terrestrial applications. A pressure-control hydraulic method can be used as well; the bellows is fed through the input 6 with oil, the pressure of the oil being regulated by means of a valve (or similar device).

The device subject of the invention optimally lends to be operated by a fixed-volume hydraulic system, as described in the following with reference to FIG. 6, allowing to make manipulators of small dimension, showing high dexterity, suitable to be used underwater and requiring just electric power to be operated.

In such hydraulic system, each of the bellows (slave) S1 used to actuate the manipulator, in any of the above described variant embodiments, is coupled to a second bellows (master) S2 by means of a fixed-volume closed-circuit filled with not-compressible fluid (e.g., hydraulic oil). The two bellows may be coupled by way of example, by a little pipe T allowing the passage of the fluid between them.

This system is able to transduce a mechanical displacement of the master bellows S2 in a displacement of the slave bellows S1 (the amplitude ratio of said displacements being the reverse of the ratio of the equivalent section areas of the two bellows), and to transmit a mechanical force applied to one of the bellows to the other one, being the transmission ratio equal to the ratio of the equivalent section areas of the two bellows.

For the displacement of the master bellows S2, as driving device AT, it may be used either rotational electric motors coupled to a rotary-linear conversion device (by example a screw device ended with a piston ST), or linear electric motors, by example of the "Voice-Coil" type where the piston ST is moved by the magnetic force generated by the motor.

The latter, showing virtually no friction, are specially suited for the implementation of robotic manipulators using the no-friction characteristic of the actuation device to achieve a fine control of the contact force applied to the object.

The master bellows S2 and the slave one S1 are coupled by means of a fluid line T, generally flexible and pressure-resistant, forming a fixed-volume hydraulic circuit, filled with not-compressible fluid.

The driving device AT, by way of example of the voice-coil type, is coupled to the free end of master bellows S2 so that its line of action is substantially in line with the longitudinal axis of said bellows S2.

By applying a force to the free end of the bellows S2 the electric motor can produce a longitudinal deformation of the bellows S2. It follows a volume variation of the master bellows that causes a corresponding amount of fluid to flow to or from the slave bellows S1, inducing a longitudinal deformation thereof and so transmitting the motion to the device.

A further advantageous characteristic of the fixed-volume system of operation, comes from the direct proportionality relation existing between the length variations of the two bellows; that characteristic allows accurate evaluation of the length of the slave bellows on the basis of a measurement of the master bellows. This avoids the need install position transducers on the manipulator, and instead allows installation of these in the operating section, therefore in a sheltered location and with less stringent dimensional constrains. In the same manner, the remote location of the operating section proves advantageous.

Variants of the above embodiments described by way of example and without restriction are possible without going out of the scope of the invention.

To optimize the longitudinal deformation range of the bellows, the mounting of moveable member 1 on static member 4 may comprise, in addition to pivot pin 5, a flexible element, like a spring, for compression preloading of the bellows 3.

Pivot pin 5 may be replaced by a flexible element, like a spring steel thin plate for compression preloading of the bellows.

The outside surface of the finger may be given a suitable shape, in case coated by a protective layer able also to make easier the gripping of objects, like, by way of example, urethane foam. Moveable members may be actuated either pushing or pulling, by orienting the rotation axes around the pivot pins 5 in a suitable direction.

What is claimed is:

1. Actuation device comprising:
   (a) a static member;
   (b) at least one moveable member pivotally mounted to the static member so as to have at least a degree of freedom with reference to the static member, the at least one moveable member defining at least one cavity; and
   (c) at least one flexible bellows operated by a pressurized fluid and adapted to produce motion of the at least one moveable member, the at least one flexible bellows having two ends mounted to the at least one moveable member and the static member respectively, the at least one flexible bellows being at least partially housed in the at least one cavity and being dimensionally sized smaller than the at least one cavity whereby the at least one bellows is free to vary in length within the cavity under influence of the pressurized fluid but is restrained to bend sideways by the cavity walls.

2. Device in accordance with claim 1, wherein the at least one movable member is mounted to the static member by means of hinging about a pivot pin in the static member, so that length variation of the at least one flexible bellows generated under influence of the pressurized fluid provides a rotational motion of the at least one moveable member in a direction normal to a rotation axis of the pivot pin.

3. Device in accordance with claim 2, wherein the at least one moveable member can be actuated either pushing or pulling, by orienting in a suitable direction the rotation axis of the pivot pin.

4. Device in accordance with claim 1, wherein the pressurized fluid is fed into the at least one flexible bellows through an input formed in an element mounting the at least one flexible bellows to the static member.

5. Device in accordance with claim 1, wherein the static member has an extension facing the at least one moveable member, the at least one moveable member being able to move toward the extension so to grasp objects.

6. Device in accordance with claim 1, wherein the at least one moveable member comprises at least two moveable members, each moveable member actuated by its own one of the at least one flexible bellows to converge against the other at least two moveable members so to grasp objects.

7. Device in accordance with claim 1, wherein the at least one moveable member is mounted to the static member by a joint allowing a two-degrees-of-freedom motion about a pivot point.

8. Device in accordance with claim 7, wherein the at least one flexible bellows is a plurality of flexible bellows and the at least one moveable member is actuated by the plurality of flexible bellows, each flexible bellows is housed in its own one of the at least one cavity in the at least one moveable member.

9. Device in accordance with claim 8, wherein the flexible bellows and their respective cavities are placed symmetrically to the joint, equally angularly spaced therearound.

10. Device in accordance with claim 8, wherein the flexible bellows and their respective cavities are placed nonsymmetrically opposed with reference to the joint, notequally angularly spaced therearound.

11. Device in accordance with claim 7, wherein said at least one moveable member can be actuated either pushing or pulling, by orienting in a suitable direction pivoting axes of the joint.

12. Device in accordance with claim 1, wherein the at least one moveable member is formed of two members mounted in series where the pressurized fluid can flow from the flexible bellows in one member to the flexible bellows in the other member through a channel.

13. Device in accordance with claim 1, further comprising a system for feeding the pressurized fluid into the at least one flexible bellows.

14. Device in accordance with claim 13, wherein the system has a fixed-volume.

15. Device in accordance with claim 14, wherein the system has remote bellows coupled to the at least one flexible bellows by means of a fixed volume closed circuit filled with noncompressible fluid whereby a driving action on the remote bellows is converted in a corresponding driving action on the at least one flexible bellows.

16. Device in accordance with claim 15, wherein the driving action on the remote bellows causes a longitudinal deformation thereof, corresponding to a volume variation, and causing a corresponding amount of fluid to flow to or from the at least one flexible bellows with a following longitudinal deformation thereof and transmission of motion to the at least one moveable member.

17. Device in accordance with claim 16, wherein the driving action on the remote bellows is provided by a rotational electric motor coupled to a rotary-linear conversion device driving said remote bellows.

18. Device in accordance with claim 16, wherein the driving action of the remote bellows is provided by a linear electric motor (AT), where a piston (ST) driven by the motor drives the remote bellows.

19. Device in accordance with claim 18, wherein the motor is a voice-coil motor for driving the piston by a magnetic force.

20. Device in accordance with claim 13, wherein the pressurized fluid is gaseous and pressure thereon is regulated by a valve.

21. Device in accordance with claim 13, wherein the pressurized fluid is liquid and pressure thereon is regulated by a valve.

* * * * *

UNITED STATES PATENT AND TRADEMARK OFFICE
CERTIFICATE OF CORRECTION

PATENT NO.   : 6,484,601 B1
DATED        : November 26, 2002
INVENTOR(S)  : Vincenzo Arrichiello It is certified that error appears in the above-identified patent and that said Letters Patent is hereby corrected as shown below:

Title page, Item [54] and Column 1, line 3,
Should be -- BELLOWS ACTUATION DEVICE, ESPECIALLY FOR ROBOTIC MANIPULATOR --.

Title page,
Item [30], Foreign Application Priority Data, "JP98A0006" should be
-- SP98A000006 --.

Column 1,
Line 16, "is required" should be deleted.
Line 17, after ")", -- is required -- should be inserted.
Line 27, "provides" should be -- proves --.

Column 2,
Line 29, "subject" should be deleted.

Column 3,
Line 41, "is" should be -- in --.
Line 42, after "implement", -- the -- should be inserted.
Line 64, "of" should be -- or --.

Column 5,
Line 34, "11" should be -- 1,1 --.
Line 36, after "3,3"", -- , -- should be inserted.

Column 7,
Line 35, after "two", "-" should be deleted.

Signed and Sealed this

Twenty-seventh Day of May, 2003

JAMES E. ROGAN
*Director of the United States Patent and Trademark Office*